(12) United States Patent
Oh et al.

(10) Patent No.: US 8,000,309 B2
(45) Date of Patent: Aug. 16, 2011

(54) METHOD FOR TRANSMITTING SIGNAL AND METHOD FOR RECEIVING SIGNAL

(75) Inventors: Hyun-Seo Oh, Daejeon (KR); Hyun-Kyun Choi, Daejeon (KR); Sang-In Kim, Gyeongsangbuk-do (KR); Keon-Kook Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 554 days.

(21) Appl. No.: 12/013,792

(22) Filed: Jan. 14, 2008

(65) Prior Publication Data

US 2009/0103460 A1 Apr. 23, 2009

(30) Foreign Application Priority Data

Oct. 17, 2007 (KR) .................. 10-2007-0104537

(51) Int. Cl.
*H04B 7/216* (2006.01)
*H04K 1/10* (2006.01)
(52) U.S. Cl. .................. 370/342; 375/260
(58) Field of Classification Search .......... 370/532–541, 370/335, 342–344; 375/260–264
See application file for complete search history.

(56) References Cited

U.S. PATENT DOCUMENTS

| | | | | |
|---|---|---|---|---|
| 6,069,884 A * | 5/2000 | Hayashi et al. | ............... | 370/335 |
| 7,065,144 B2 * | 6/2006 | Walton et al. | ................. | 375/260 |
| 7,092,431 B2 * | 8/2006 | Maeda et al. | ................. | 375/144 |
| 7,116,632 B2 | 10/2006 | Alapuranen | | |
| 2003/0123530 A1 * | 7/2003 | Maeda et al. | ................. | 375/148 |
| 2005/0018598 A1 | 1/2005 | Borran et al. | | |
| 2005/0270969 A1 * | 12/2005 | Han et al. | ....................... | 370/210 |
| 2006/0045001 A1 * | 3/2006 | Jalali | .............................. | 370/208 |
| 2007/0097942 A1 * | 5/2007 | Gorokhov et al. | ............ | 370/342 |
| 2008/0273516 A1 * | 11/2008 | Kim et al. | ..................... | 370/344 |
| 2008/0273517 A1 * | 11/2008 | Nishio et al. | .................. | 370/345 |
| 2009/0129322 A1 | 5/2009 | Suwa et al. | | |
| 2009/0196165 A1 * | 8/2009 | Morimoto et al. | ............ | 370/208 |
| 2009/0201849 A1 | 8/2009 | Sawahashi et al. | | |

(Continued)

FOREIGN PATENT DOCUMENTS

JP 2003-091495 A 3/2003

(Continued)

OTHER PUBLICATIONS

Christian Schlegel, et al., A Novel Random Wireless Packet Multiple Access Method Using CDMA, IEEE Transactions on Wireless Communications, vol. 5, No. 6, Jun. 2006, pp. 1362-1370.

(Continued)

*Primary Examiner* — Thai D Hoang
(74) *Attorney, Agent, or Firm* — Kile Park Goekjian Reed & McManus PLLC

(57) ABSTRACT

A method for transmitting a signal according to the present invention comprises spreading a control channel data through a PN code and generating a diffused control channel data; time division multiplexing the diffused control channel data and a service channel data and generating a multiplexed signal; and inverse Fourier transforming the multiplexed signal and generating an inverse Fourier transformed signal.

Accordingly, in multi-hop communication, frequency efficiency is improved by not using different RF frequencies between a control channel and service channel, and applying a control channel and service channel through the TDM (Time Division Multiplexing) method, and the channel efficiency is improved by WAVE channel switching.

7 Claims, 9 Drawing Sheets

U.S. PATENT DOCUMENTS

| | | | |
|---|---|---|---|
| 2009/0323642 A1* | 12/2009 | Tanno et al. | 370/336 |
| 2010/0014486 A1* | 1/2010 | Kishiyama et al. | 370/335 |
| 2010/0061359 A1* | 3/2010 | Fukuoka et al. | 370/342 |
| 2010/0103901 A1* | 4/2010 | Miki et al. | 370/330 |

FOREIGN PATENT DOCUMENTS

| | | |
|---|---|---|
| JP | 2006-287756 A | 10/2006 |
| KR | 1020050025655 | 3/2005 |
| KR | 1020060015638 A | 2/2006 |
| KR | 1020060050068 | 5/2006 |
| WO | 2006-112292 A1 | 10/2006 |
| WO | 2007-016553 A1 | 2/2007 |

OTHER PUBLICATIONS

Hyun Seo Oh, et al., The Third International Workshop on Vehicle-to-Vehicle Communications 2007 in conjunction with IEEE Intelligent Vehicles Symposium 2007, Title: CDMA/OFDM based Radio Access for Vehicle Multi-hop Network, Jun. 12, 2007, 8 pages.

"V2V/V21 Communication Technique Development", by Hyun Seo Oh, Telematics development group, Telematics/USN development team, ETRI, May 18, 2007.

* cited by examiner

FIG. 6

| Pilot PN Code | | | | | | | |
|---|---|---|---|---|---|---|---|
| $C1(0)$ | $C1(1)$ | $C1(2)$ | $C1(3)$ | $C1(4)$ | $C1(5)$ | ... | $C1(n-1)$ | $C1(n)$ |
| $f_0$ | $f_1$ | $f_2$ | $f_3$ | $f_4$ | $f_5$ | ... | $f_{N-2}$ | $f_{N-1}$ |

Spread signal of control channel

| $C1(0)$ *D0 | $C1(1)$ *D0 | $C1(2)$ *D0 | $C1(3)$ *D0 | $C1(4)$ *D0 | $C1(5)$ *D0 | ... | $C1(n-1)$ *D0 | $C1(n)$ *D0 |
|---|---|---|---|---|---|---|---|---|
| $f_0$ | $f_1$ | $f_2$ | $f_3$ | $f_4$ | $f_5$ | ... | $f_{N-2}$ | $f_{N-1}$ |

METHOD FOR TRANSMITTING SIGNAL AND METHOD FOR RECEIVING SIGNAL

CROSS-REFERENCE TO RELATED APPLICATION

This application claims priority to and the benefit of Korean Patent Application No. 10-2007-0104537 filed in the Korean Intellectual Property Office on Oct. 17, 2007, the entire contents of which are incorporated herein by reference.

BACKGROUND OF THE INVENTION (a) Field of the Invention

The present invention relates to a method for transmitting signals and receiving signals in a multi-hop communication network.

This work was supported by the IT R&D program of MIC/IITA [2007-F-039-01, Vehicle Multi-hop Communication Technology Development].

(b) Description of the Related Art

WAVE (Wireless Access for Vehicle Environment) technique is IEEE (Institute of Electrical and Electronics Engineers) 802.11p wireless access technique for providing communication between a vehicle and base station or between vehicles.

The radio channel of the WAVE technique includes a control channel and a service channel.

The control channel is used for transmitting system control information or vehicle safe information, the service channel is used for transmitting user information, and the control channel and the service channel are allocated different frequency channels.

As described above, in order to allocate the control channel and service channel frequency separately in the WAVE technique, RF (Radio Frequency) channel switching is performed, thus there is the drawback of decreasing the time resource efficiency and increasing packet latency.

A wireless access protocol in the WAVE technique uses the CSMA/CA (Carrier Sense Multiple Access with Collision Avoidance) method.

The CSMA/CA method generates interference between terminals by contacting a plurality of terminal nodes simultaneously because of a Hidden Node, and there is the problem that the system latency increases remarkably according to increasing terminals because of the collision of wireless links.

Accordingly, the WAVE technique decreases the frequency resource efficiency and is a hard to provide system in real-time.

The above information disclosed in this Background section is only for enhancing the understanding of the background of the invention and therefore it may contain information that does not form the prior art that is already known in this country to a person of ordinary skill in the art.

SUMMARY OF THE INVENTION

The present invention has been made in an effort to provide the method for transmitting a signal and the method for receiving a signal by improving the frequency resource efficiency and preventing the collision between terminal nodes as wireless access between mobile stations by setting the multi-hop communication network.

A method for transmitting a signal according to the present invention comprises spreading a control channel data through a PN code and generating a spread control channel data;

time division multiplexing the spread control channel data and a service channel data and generating a multiplexed signal; and inverse Fourier transforming the multiplexed signal and generating an inverse Fourier transformed signal.

Generating the multiplexed signal comprises: multiplexing the spread control channel data and a pilot PN code to generate a multiplexed control channel data; multiplexing the service channel data and a pilot code to generate a multiplexed service channel data; and multiplexing the multiplexed control channel data and the multiplexed service channel data to generate the multiplexed signal.

Generating the multiplexed control channel data is:

time division multiplexing the spread control channel data and the pilot PN code.

Generating the multiplexed service channel data is time division multiplexing the service channel data and the pilot code.

The control channel has a request channel and a conform channel, and the request channel and the conform channel are time division duplexed.

A method for receiving a signal comprises:

Fourier transforming a received signal and generating a Fourier transformed signal;

demultiplexing the Fourier transformed signal and extracting a control channel signal and a service channel signal from the Fourier transformed signal; and generating a control channel data through a PN code from the control channel signal.

Demultiplexing the Fourier transformed time division signal demultiplexes the Fourier transformed signal The method for receiving the signal of claim further comprises:

applying a plurality of PN codes and a plurality of pilot codes to the received signal and searching a time position of the control channel signal and the service channel signal, wherein demultiplexing the Fourier transformed signal demultiplexes the Fourier transformed signal according to the time position.

A method for transmitting a signal comprises:

coding a control channel data and a service channel data and generating a coded control channel data and a coded service channel data;

spreading the coded control channel data according to a PN code and generating a spread control channel data;

multiplexing the spread control channel data and the service channel data with each synchronization code and generating a multiplexed control channel signal and a multiplexed service channel signal;

time division multiplexing the multiplexed control channel signal and the multiplexed service channel signal and generating a multiplexed signal; and inverse Fourier transforming the multiplexed signal and generating a inverse Fourier transformed signal.

Generating the multiplexed control channel signal and the service channel signal comprises:

time division multiplexing the diffused control channel data and a pilot PN code and generating the multiplexed control channel signal; and time division multiplexing the service channel data and a pilot code and generating the multiplexed service channel signal.

The control channel has a request channel and a conform channel, and the request channel and the conform channel is time division duplexed.

According to the present invention, in multi-hop communication, frequency efficiency is improved by not using different RF frequency between a control channel and service channel, and applying a control channel and a service channel by the TDM (Time Division Multiplexing) method, and the channel efficiency is improved by WAVE channel switching.

In addition, since the control channel of a multi-hop communication network is applied for the CDMA (Code Division Multiple Access) method, it is possible for the connection link despite interference by the simultaneous contact between mobile stations.

In addition, since 1:1 communication is applied for the OFDM (Orthogonal Frequency Division Multiplexing) method, the merit of the fast packet transmission is supported and the compatibility for the established WAVE standard is preserved.

A high directional antenna is used when the service channel is used between the mobile stations, and transmission speed is approved by approving wireless link gain by minimizing the interference.

BRIEF DESCRIPTION OF THE DRAWINGS

FIG. 6 is a diagram illustrating the transmission signal in the format of a control channel according to an exemplary embodiment of the present invention.

DETAILED DESCRIPTION OF THE EMBODIMENTS

Figure 1:
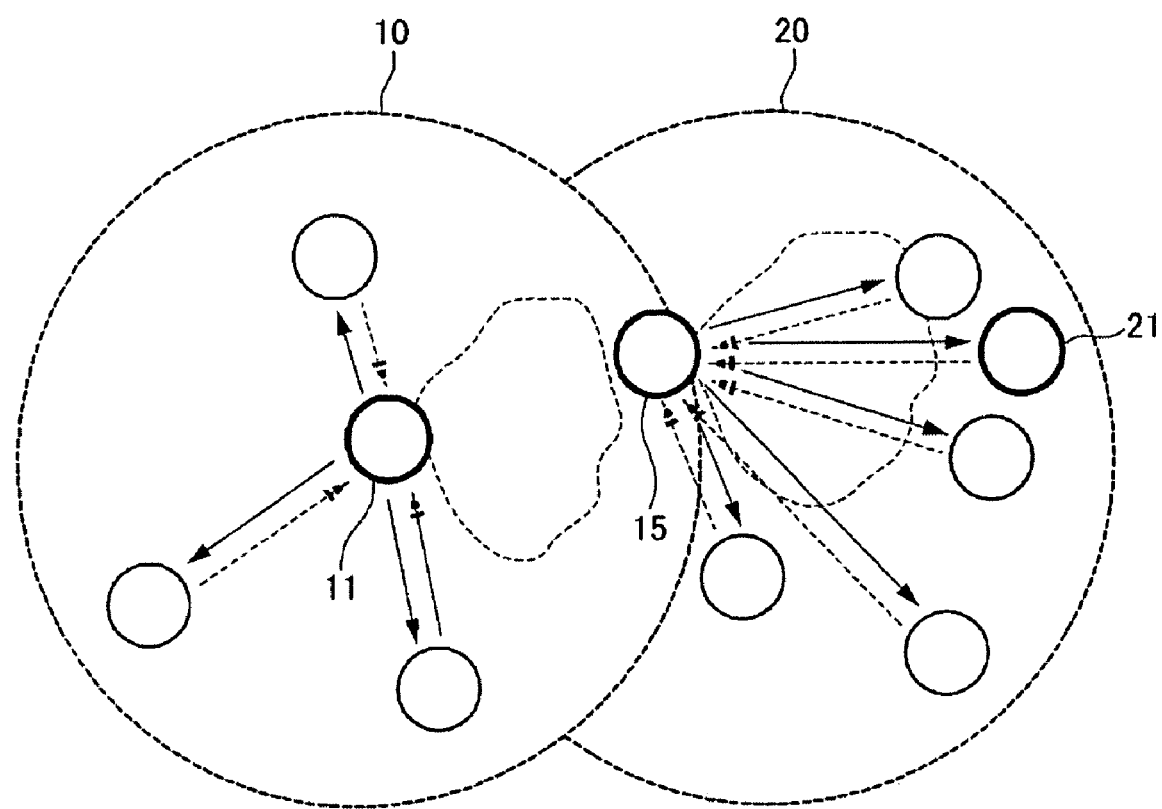
FIG. 1 is a schematic diagram illustrating a 1:1 multi-hop network.

In the following detailed description, only certain exemplary embodiments of the present invention have been shown and described, simply by way of illustration.

As those skilled in the art would realize, the described embodiments may be modified in various ways, all without departing from the spirit or scope of the present invention.

Accordingly, the drawings and description are to be regarded as illustrative in nature and not restrictive.

Like reference numerals designate like elements throughout the specification.

In addition, unless explicitly described to the contrary, the word "comprise", and variations such as "comprises" or "comprising", will be understood to imply the inclusion of stated elements, but not the exclusion of any other elements.

As used in this application, a mobile station (MS) may be referred to as, and include some or all the functionality of, a terminal, a mobile terminal (MT), a subscriber station (SS), a portable subscriber station (PSS), a user equipment (UE), an access terminal (AT) or some other terminology.

Hereinafter, a multi-hop communication network will be described referring to FIG. 1.

FIG. 1 is a schematic diagram illustrating a 1:1 multi-hop network.

As shown in FIG. 1, the multi-hop communication network is formed from the wireless access between mobile stations 11, 15, and 21, and the mobile stations 11, 15, and 21 performs network initialization and the multi-hop communication.

A cell 10 is formed from the mobile station 11, and a cell 20 is formed from the mobile station 21.

Each mobile station 11 and 21 can perform wireless access to other mobile stations in cells 10 and 20 controlled by the mobile stations 41 and 21.

In other words, the first mobile station 11 can perform wireless access to the other mobile station 15 in the first cell 10, and the second mobile station 21 can perform wireless access to the other mobile station 15 in the second cell 20.

The first cell 10 and the second cell 20 may be piled on some of the next cells 10 and 20 according to a distance between mobile stations 11 and 21. The first mobile station 11 has to know the information of the third mobile station 15 in the first cell 10 in order for the first mobile station 11 to form the communication network with the second mobile station 21.

In other words, the first mobile station 11 transmitting has to know the mobile station ID of the mobile station in the communication cell, relative position or condition of the mobile station (moving speed, moving direction, etc.), and the first mobile station 11 transmits the information and channel contact in accordance with this information.

The first mobile station 11 generates a routing table to the second mobile station 21 and transmits routing information and a data packet when the first mobile station 11 knows the third mobile station 15 in the first cell 10.

The first mobile station 11 may have interference from the next mobile station when transmitting the data packet, because transmitting the data packet is fast.

For 1:1 multi-hop communication, the first mobile station 11 has to perform information collection, channel connection, and information transition because of the movement of the mobile station 11 and 15 in a short time.

Moreover, the channel contact and the packet transmission have to be performed under normal conditions, though there is interference between mobile stations in the first cell 10 and interference generated from the next cell 20.

In order that the first mobile station 11 in the first cell 10 transmits the information to the second mobile station 21 outside the first cell 10, the first mobile station 11 transmits its ID, the ID of the mobile station wanted the communication, and the RTS (Request-To-Send) signal to the third mobile station 15 in the first cell 10.

The third mobile station 15 transmits the RTS signal from the first mobile station 11 to the second mobile station 21.

When the second mobile station 21 receives the RTS signal of the first mobile station 11, and transmits its CTS (Clear-To-Send) signal to the first mobile station 11 through the third mobile station 15, communication is formed between the first mobile station 11 and the second mobile station 21 through the third mobile station 15.

A packet response may be delayed by a mutual interference when the other mobile station in the next cell transmits because this channel connection uses the CSMA/CA method in the local area network (WLAN) or sensor network.

Hereinafter, the channel contact method will be described, though the channel contact is possible on the radio channel condition having interference between the mobile stations referring to FIG. 2.

Figure 2:
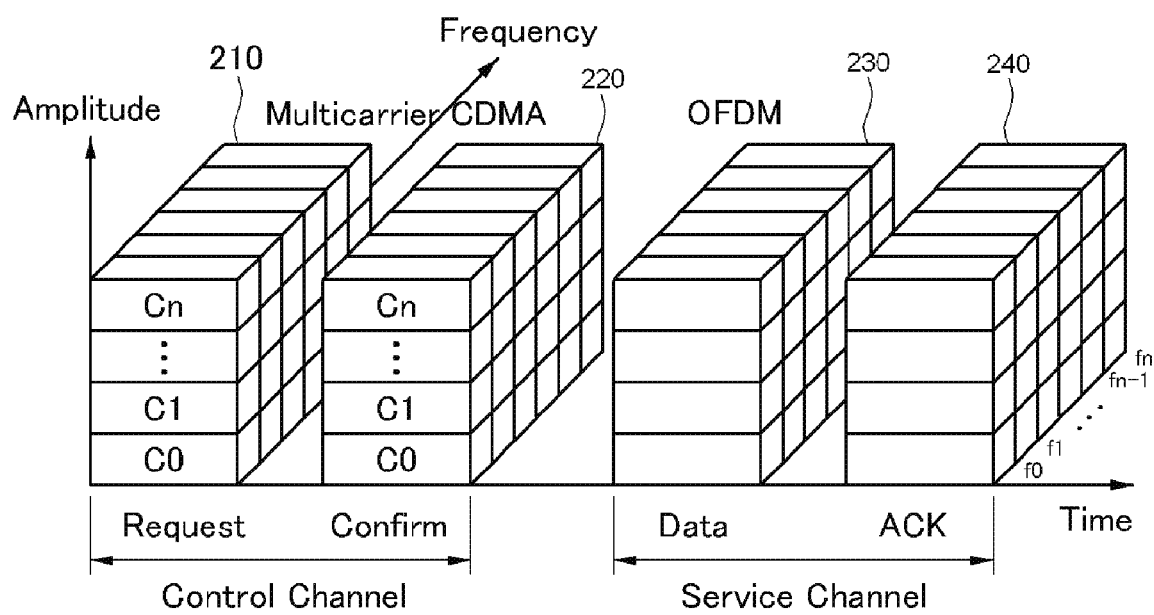
FIG. 2 is a diagram illustrating the modulation signal shape of the control channel and service channel.

FIG. 2 is a diagram illustrating the modulation signal shape of the control channel and service channel.

As shown in FIG. 2, the first mobile station 11 selects a unique random code (C0-Cn), for example gold code, stored in its memory and diffuses the code when the first mobile station 11 in the first cell 10 wants to communicate with the second mobile station 21 outside the first cell 10.

The other mobile stations in the first cell 10 transmit their ID information, received signal level or position information when the first mobile station 11 transmits the RTS signal 210.

This information is used so that the first mobile station 11 knows the information of the mobile stations in the first cell 10 and makes the routing table.

At that time, the other mobile stations in the first cell 10 transmits CTS signal 220, multicarrier CDMA signal by the CDMA method and the first mobile station 11 can receive the CTS signal 220 received from the next mobile station simultaneously.

The first mobile station 11 performs the data transmission to the second mobile station 21 when the first mobile station 11 knows the information of the third mobile station 15 in the first cell 10.

As shown in FIG. 2, this data transmission is performed by the OFDM method to transmit the packet data on the movement condition.

The third mobile station 15 receives the packet data 230 and transmits the packet data 230 to the second mobile station 21 when the first mobile station 11 modulates the packet data 230 to the OFDM signal and transmits the packet data 230.

The second mobile station 21 receives the packet data 230, modulates the ACK (Acknowledge) signal 240 to the OFDM signal and transmits the first mobile station 11 through the third mobile station 15.

The packet data 230 and ACK signal 240 is the OFDM signal and is transmitted by the TDMA (Time Division Multiple Access) method in order to not have interference from the other cell, and the transition is performed in accordance with the synchronization of transmitting/receiving between mobile stations and scheduling.

Hereinafter, the structure and movement of the transmitter of the mobile station will be described.

Figure 3:
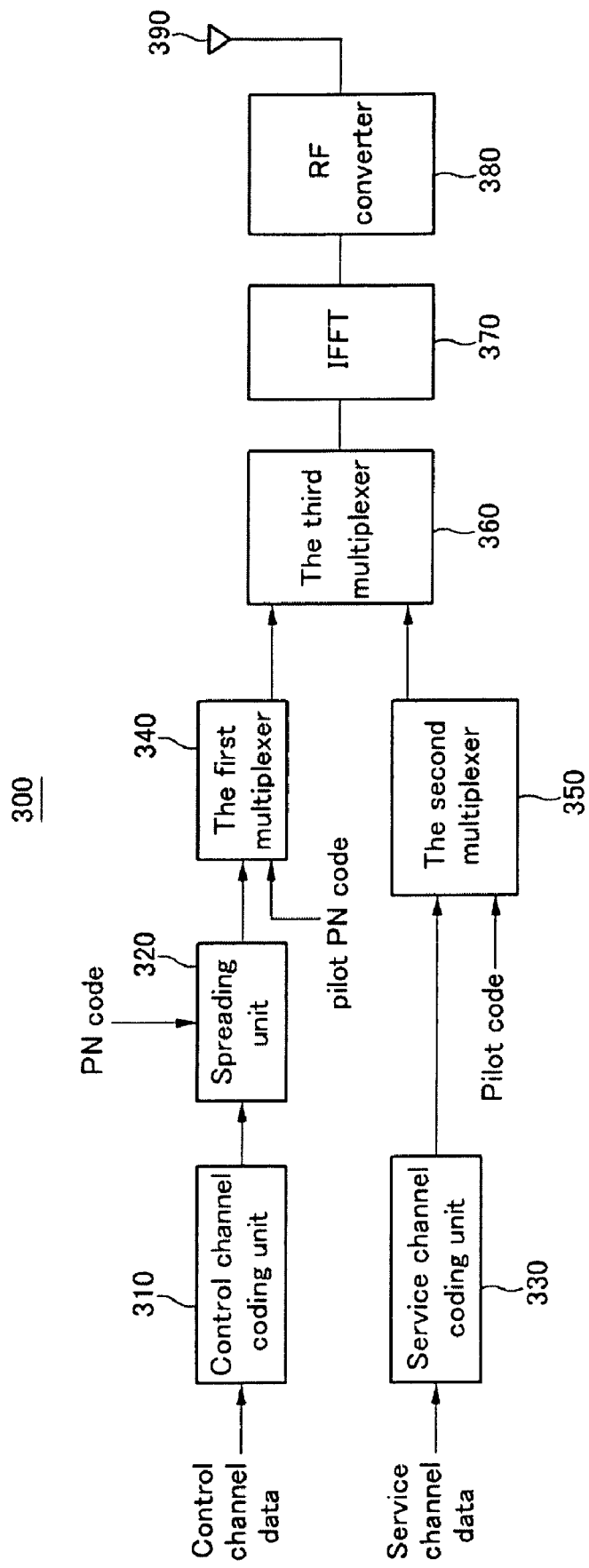
FIG. 3 is a block diagram illustrating a transmitter according to an exemplary embodiment of the present invention.

FIG. 3 is a block diagram illustrating a transmitter according to an exemplary embodiment of the present invention.

As shown in FIG. 3, the transmitter 300 according to an exemplary embodiment of the present invention includes a control channel coding unit 310, a spreading unit 320, a service channel coding unit 330, a first multiplexer 340, a second multiplexer 350, a third multiplexer 360, an inverse Fourier fast transfer (IFFT) 370, an RF converter 380 and an antenna 390.

Figure 4:
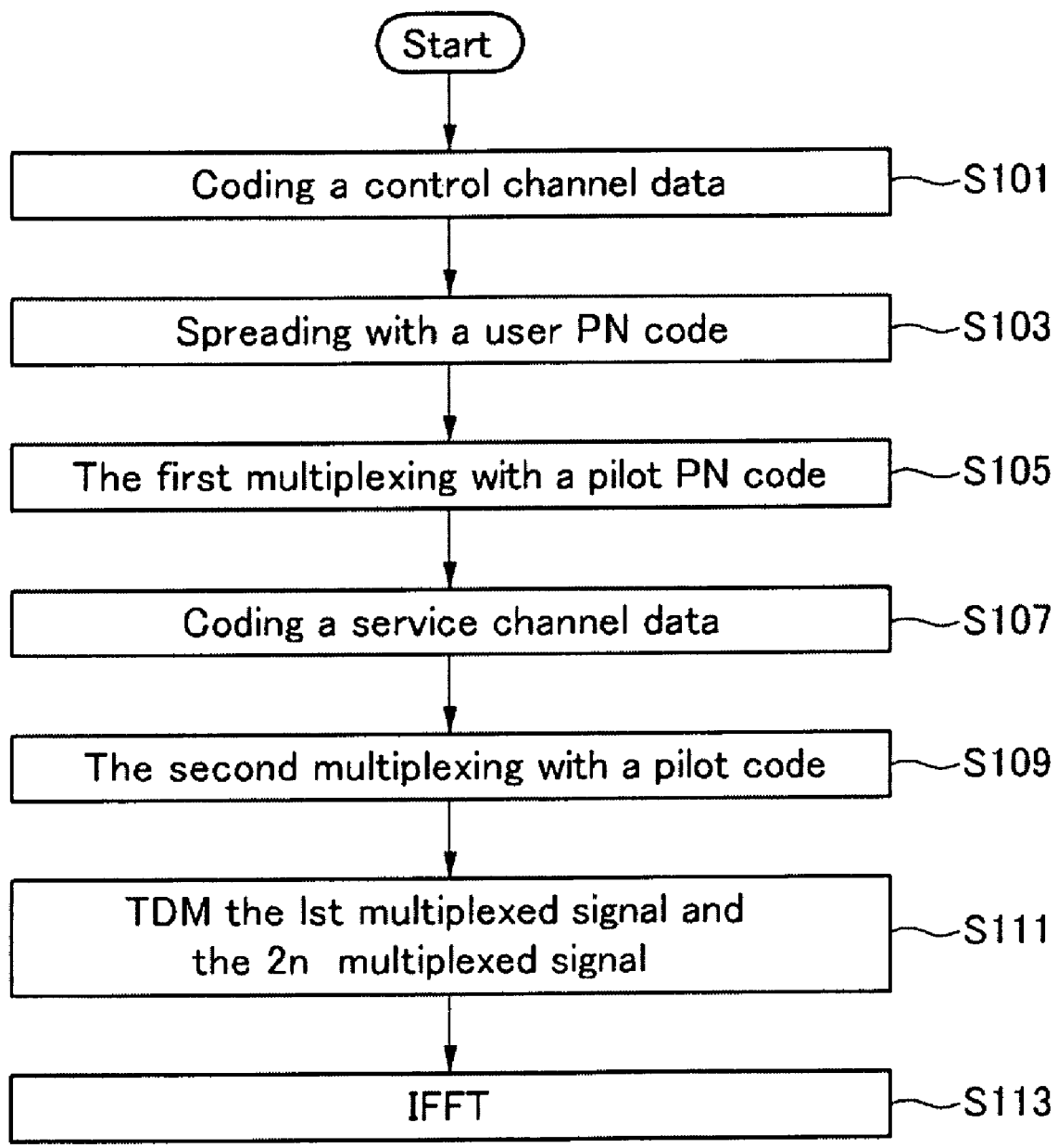
FIG. 4 is a flowchart illustrating the action of the transmitter in FIG. 3.
Figure 5:
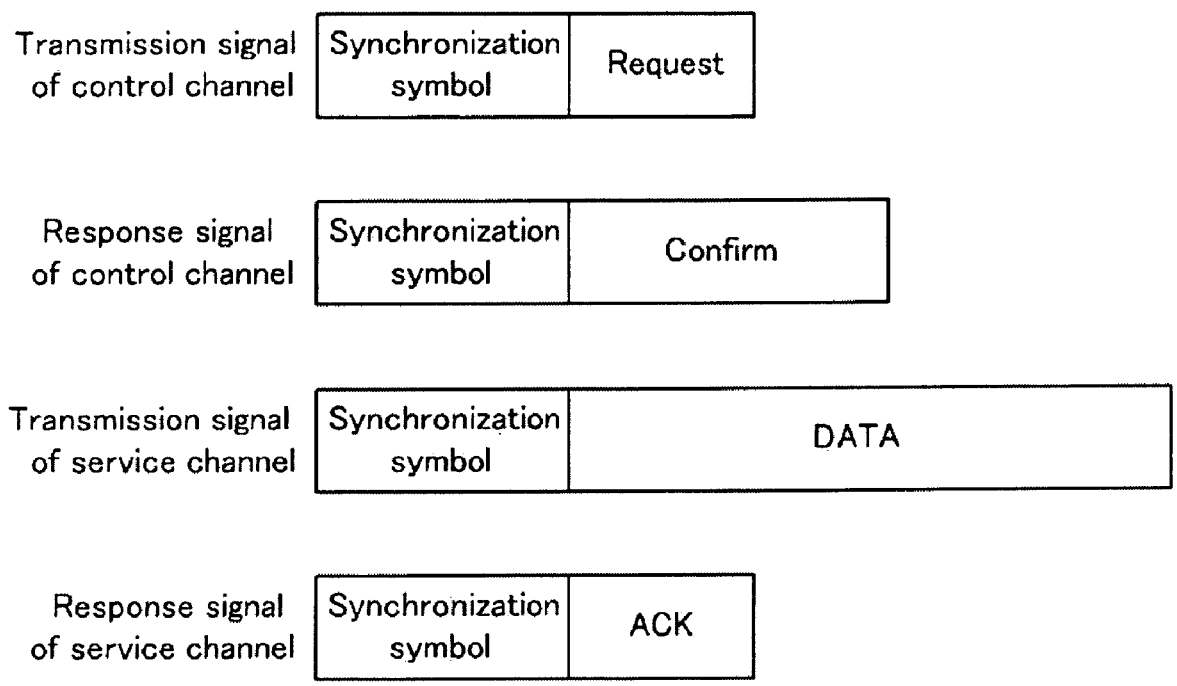
FIG. 5 is a diagram illustrating the transmission frame of a control channel and service channel according to an exemplary embodiment of the present invention.
Figure 7:
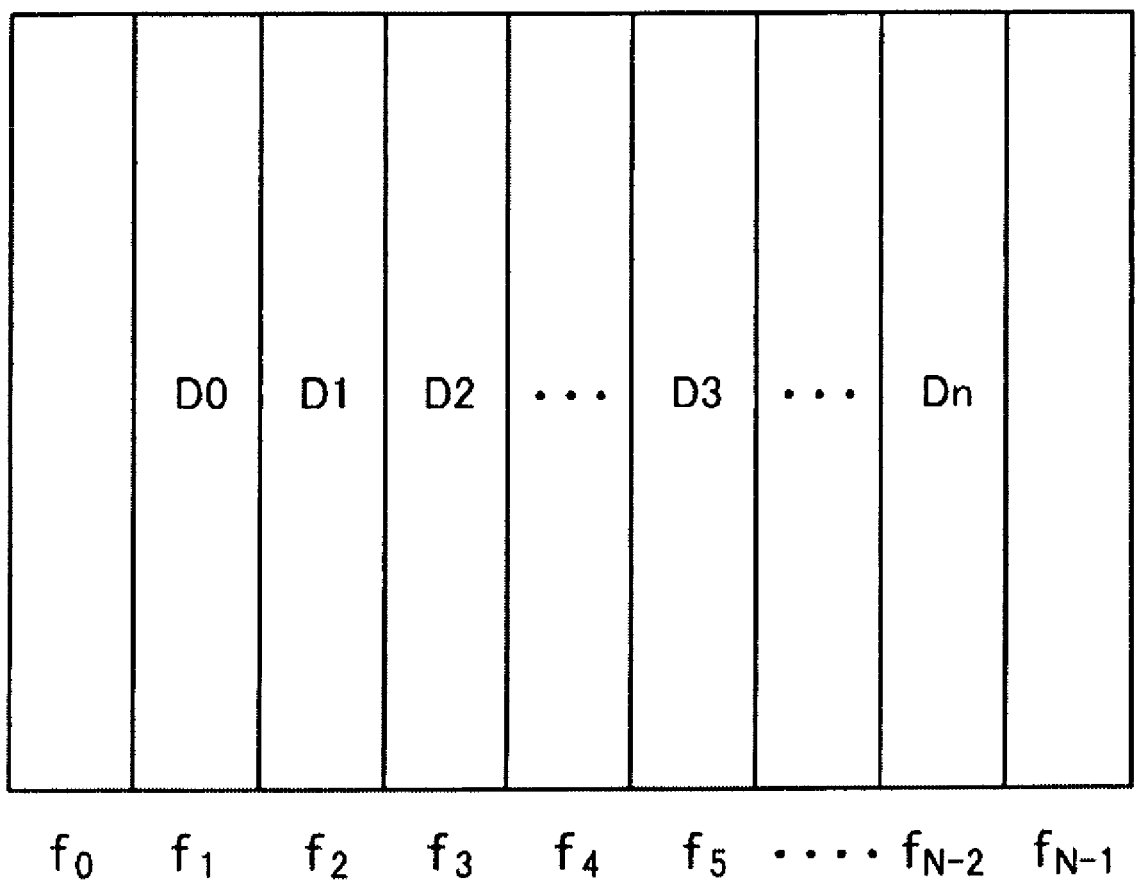
FIG. 7 is a diagram illustrating the transmission signal the format of a service channel according to an exemplary embodiment of the present invention.

FIG. 4 is a flowchart illustrating the action of the transmitter on FIG. 3, FIG. 5 is a diagram illustrating the transmission frame of control channel and service channel according to an exemplary embodiment of the present invention, FIG. 6 is a diagram illustrating the transmission signal format of the control channel according to an exemplary embodiment of the present invention, and FIG. 7 is a diagram illustrating the transmission signal format of the service channel according to an exemplary embodiment of the present invention.

As shown in FIG. 4, the control channel coding unit 310 performs channel coding as turbo coding or convolution coding to control channel data, generates control channel data being channel encoded, and outputs the control channel data (S101).

The spreading unit 320 operates Exclusive OR of the output signal from the control channel coding unit 310 with a user pseudo noise code (PN code) and spreads.

The user PN code is selected and used randomly early on (S103).

The first multiplexer 340 multiplexes pilot pseudo noise code (pilot PN code) and the output signal from the spreading unit 320, and outputs the multiplexed control channel signal (S105).

In addition, the service channel coding unit 330 performs channel coding as turbo coding or convolution coding to the service channel data, generates service channel data being channel encoded, and outputs the service channel data (S107).

The second multiplexer 350 multiplexes pilot code and the output signal from the output signal from the service channel coding unit 330, and outputs the multiplexed service channel signal (S109).

As shown in FIG. 5, the transmitter 300 outputs the synchronization symbol of each data before transmitting the data of the control channel and service channel corresponding to a transition frame.

The first and the second multiplexer 340 and 350 control the output order in order that the synchronization symbol of the control channel is the pilot PN code and the synchronization symbol of the service channel is the pilot code.

Next, the third multiplexer 360 performs time division multiplexing (TDM) to the control channel and the service channel, and outputs the signal being time division multiplexed (S111).

IFFT 370 performs the inverse fast Fourier transformation to the output signal from the third multiplexer 360, and modulates as the OFDM signal is inverse fast Fourier transformed (S113).

As shown in FIG. 6, on the control channel, the signal of the control channel is transmitted by the OFDM modulation method and the CDMA method.

In other words, the unique random code is allocated corresponding to the user, this code is used as the pilot PN code {C1 0-C1 $(n)$}, and the control channel data is spread with the pilot PN code {C1 0-C1$(n)$} and transmitted.

The pilot PN code {C1 0-C1$(n)$} is allocated to all subcarriers on low power.

In addition, as shown in FIG. 7, the signal of the service channel is transmitted by the OFDM modulation method.

The OFDM signal includes the pilot code as the synchronization signal in the middle of the service channel data as synchronization of IFFT and FFT.

The transmitter 300 allocates the pilot subcarrier to the pilot code for assumption of the channel.

FIG. 7 is illustrating that the 1, 5, N-th subcarriers of a plurality of subcarriers are allocated as the pilot code.

Accordingly, when the number of the subcarriers is N, and the number of the pilot subcarriers is K, the number of the spread subcarriers is N-K.

IFFT 370 allocates the same frequency to the control channel and the service channel and performs the OFDM modulation.

The RF converter 380 converts the output signal from the IFFT 370 to the RF signal through middle frequency signal (S115), amplifies the RF signal, and transmits the RF signal to the mobile station through the antenna 390.

The radio channel is a plurality of fast moving paths fading channels.

Hereinafter, the structure of the receiver of the mobile station will be described referring to FIG. 8 and FIG. 9.

Figure 8:
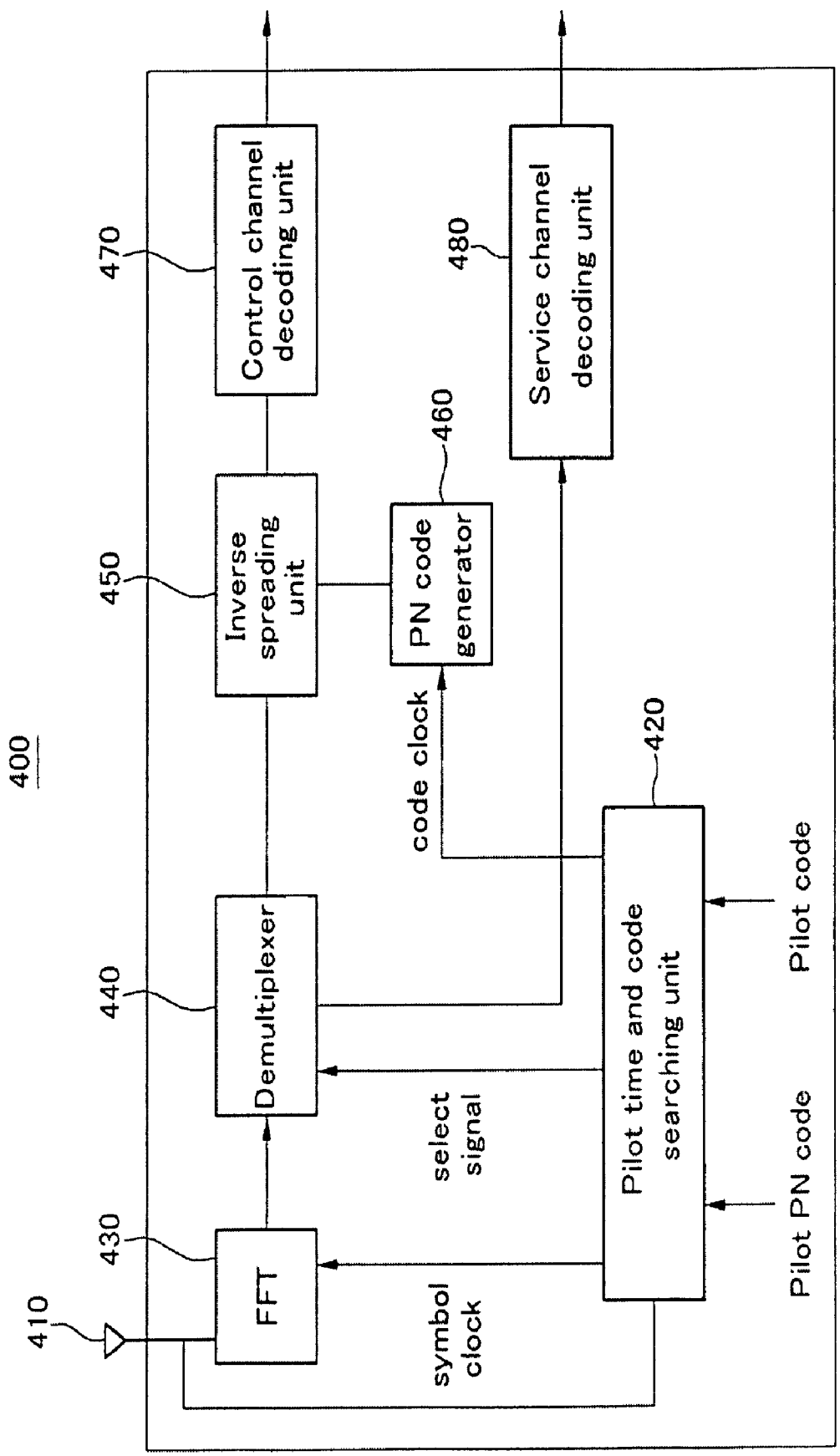
FIG. 8 is a block diagram illustrating a receiver according to an exemplary embodiment of the present.

FIG. 8 is a block diagram illustrating a receiver according to an exemplary embodiment of the present invention.

Referring to FIG. 8, the receiver 400, according to an exemplary embodiment of the present invention, includes an antenna 410, a pilot time and code searching unit 420, a fast Fourier transformer (FFT) 430, a demultiplexer 440, an inverse spreading unit 450, a PN code generator 460, a control channel decoding unit 470 and a service channel decoding unit 480.

Figure 9:
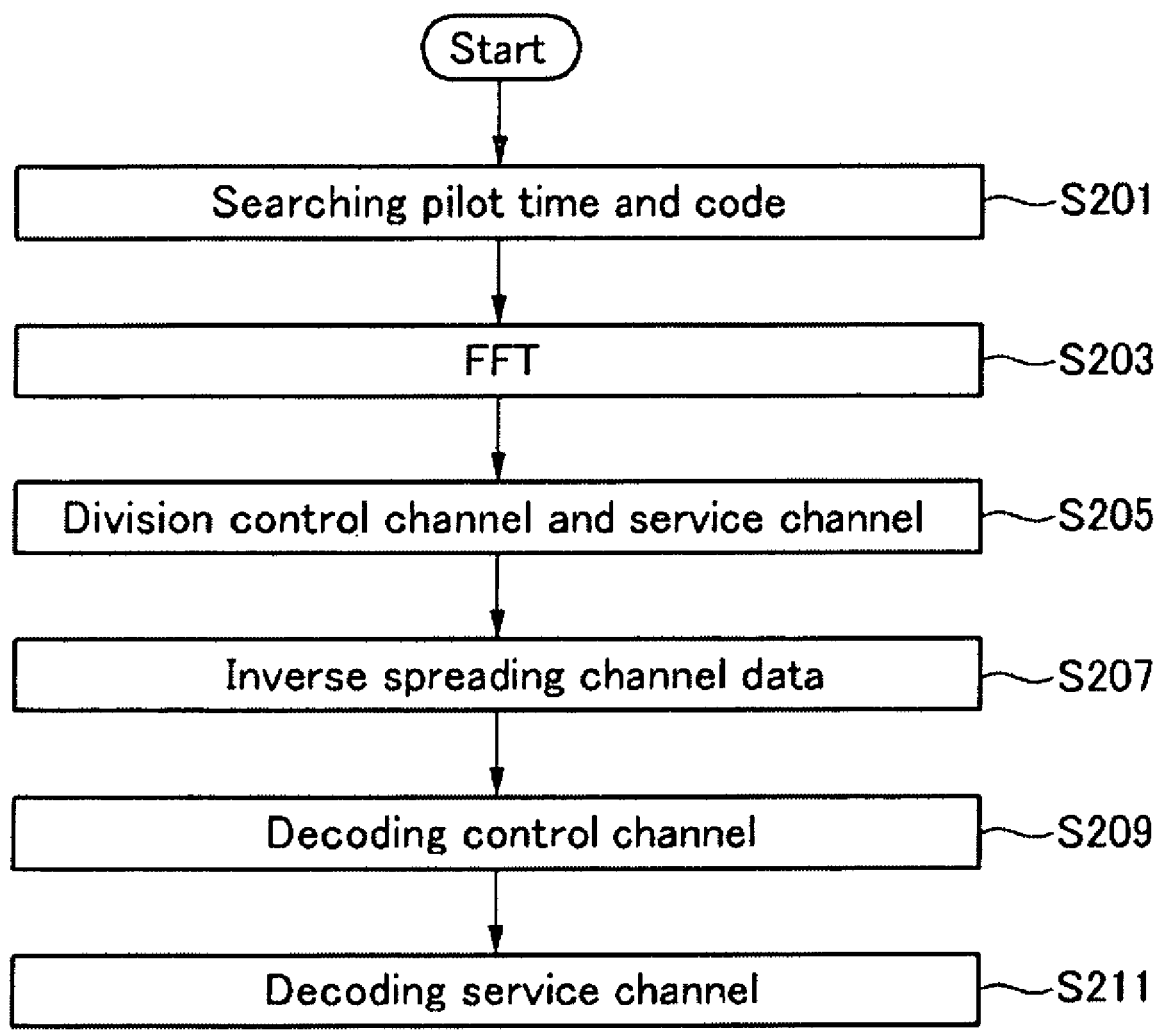
FIG. 9 is a flowchart illustrating the action of the receiver in FIG. 8.

FIG. 9 is a flowchart illustrating the action of the receiver in FIG. 8.

The receiver 400 receives signals through the radio channel from the antenna 410.

The FFT 430 and the pilot time and code searching unit 420 input the received signals.

The pilot time and code searching unit 420 searches which code is received between the pilot PN code of the control channel and the pilot code of the service channel from the synchronization symbol of the received signals (S201).

The pilot time and code searching unit 420 searches the pilot PN code region and the pilot code region simultaneously.

Accordingly, if the number of the pilot PN code is N, and the number of the pilot code is M, the searching region of the pilot time and code searching unit 420 is N×M.

The pilot time and code searching unit 420 generates a symbol clock of the FFT 430, a select signal of the demultiplexer 440, and a code clock of the PN code generator 460 according to the search result.

The FFT 430 performs the fast Fourier transformation of the received signal according to the symbol clock from the pilot time and code searching unit 420, and generates and outputs a plurality of the received signals transmitted through a plurality of subcarriers (S203).

The demultiplexer 440 separates the received symbol from the FFT 430 to the control channel data and the service channel data according to the select signal from the pilot time and code searching unit 420 (S205).

The PN code generator 460 outputs the PN code to the inverse spreading unit 450 according to the code clock from the pilot time and code searching unit 420 and performs the inverse spread of the output of the PN code generator 460 and the control channel symbol of the demultiplexer 440 (S207).

The control channel decoding unit 470 decodes the output symbol of the inverse spreading unit 450 as viterbi decoding, and generates the control channel data (S209).

And, the service channel decoding unit 480 decodes the service channel symbol from the demultiplexer 440, and generates the service channel data (S211).

In this way, the mobile station using the control channel and the service channel has an optimal performance while having synchronization with each other, and the mobile station may set the synchronization between the control channel and the service channel by using GPS (Global Positioning System).

Particularly, the communication between the vehicle terminals is performed at the service channel through the TDMA method, and the synchronization is set in the one side vehicle communication terminal.

And the high directional antenna may be applied to decline the interference at the service channel and to improve the wireless link.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a signal comprising:
   spreading a control channel data through a user Pseudo Noise (PN) code and generating a spread control channel data;
   time division multiplexing a multiplexed control channel signal and a multiplexed service channel signal and generating a multiplexed signal; and
   inverse Fourier transforming the multiplexed signal and generating an inverse Fourier transformed signal,
   wherein generating the multiplexed control channel signal and the multiplexed service channel signal comprises:
   multiplexing the spread control channel data and a pilot PN code to generate the multiplexed control channel signal,
   multiplexing a service channel data and a pilot code to generate the multiplexed service channel signal, and
   multiplexing the multiplexed control channel signal and the multiplexed service channel data to generate the multiplexed signal.

2. The method for transmitting the signal of claim 1, wherein generating the multiplexed control channel signal is:
   time division multiplexing the spread control channel data and the pilot PN code.

3. The method for transmitting the signal of claim 2, wherein:
   generating the multiplexed service channel data is time division multiplexing the service channel data and the pilot code.

4. The method for transmitting the signal of claim 1, wherein:
   the control channel has a request channel and a confirm channel, and
   the request channel and the confirm channel is time division duplexed.

5. A method for transmitting a signal comprising:
   coding a control channel data and a service channel data and generating a coded control channel data and a coded service channel data;
   spreading the coded control channel data according to a PN code and generating a spread control channel data;
   multiplexing the spread control channel data and the service channel data with each synchronization code and generating a multiplexed control channel signal and a multiplexed service channel signal;
   time division multiplexing the multiplexed control channel signal and the multiplexed service channel signal and generating a multiplexed signal; and
   inverse Fourier transforming the multiplexed signal and generating an inverse Fourier transformed signal.

6. The method for transmitting the signal of claim 5, wherein;
   generating the multiplexed control channel signal and the service channel signal comprises:
   time division multiplexing the diffused control channel data and a pilot PN code and generating the multiplexed control channel signal; and
   time division multiplexing the service channel data and a pilot code and generating the multiplexed service channel signal.

7. The method for transmitting the signal of claim 6, wherein:
   the control channel has a request channel and a confirm channel, and
   the request channel and the confirm channel is time division duplexed.

* * * * *